United States Patent [19]
Booker et al.

[11] Patent Number: 5,147,163
[45] Date of Patent: Sep. 15, 1992

[54] AUTOMATIC TREAD REMOVAL APPARATUS

[76] Inventors: Price S. Booker, 239 Dallas Rd. 851, Selma, Ala. 36701; Carl N. Donaldson, 9801 1st Ave., East, Aurora, Colo. 80010

[21] Appl. No.: 394,730

[22] Filed: Aug. 16, 1989

[51] Int. Cl.⁵ ............................................. B02C 19/12
[52] U.S. Cl. ............................ 409/199; 51/DIG. 33; 157/13; 241/279; 241/DIG. 31
[58] Field of Search ................ 409/199, 138, 139; 241/DIG. 31, 279, 222, 301; 157/13; 83/951, 495, 156, 505; 51/DIG. 33

[56] References Cited

U.S. PATENT DOCUMENTS

3,658,267 4/1972 Burwell .............................. 241/301
3,731,884 5/1973 Tupper et al. ...................... 241/222

*Primary Examiner*—Z. R. Bilinsky
*Attorney, Agent, or Firm*—Larson & Taylor

[57] ABSTRACT

An automatic apparatus for removing tread from beads of various sized tires is disclosed. The automatic apparatus includes a tire centering device for vertically orienting the tire so that the radial center axis of the tire is positioned along a horizontal reference axis. The tire centering device includes a catch box having movable side walls and movable bottom plates to accomplish this centering. After the tire is centered, the tire is moved to a tire gripping device which grips the rim of the tire. Thereafter, a tire cutter device is moved in position to cut the tread from the bead of the tire as the tire is turned one revolution. Finally, a tire ejecting device is actuated to eject the remaining bead of the tire from the tire gripping device so that the cycle can be repeated.

22 Claims, 8 Drawing Sheets

AUTOMATIC TREAD REMOVAL APPARATUS

FIELD OF THE INVENTION

The present invention relates generally to the removal of the tread from a bead of a tire, and more particularly to an automatically operated apparatus which cuts the tread in shreds from the bead of the tire.

BACKGROUND OF THE INVENTION

The disposal of used tires is increasingly becoming a difficult problem to solve due to increasing number of such tires which must be disposed of each year. In addition, the conventional means of burning tires is being precluded for environmental reasons. Therefore, there have been a number of devices disclosed in the prior art for reducing the disposal problems of tires.

For example, in U.S. Pat. No. 3,658,267 (Burwell), an apparatus for desintegrating tires and the like is disclosed. The apparatus includes a means for storing a plurality of tires therein and a means for feeding the tires one at a time to a holding means which rotates. A grinding and pulverizing means is disposed adjacent the holding means to reduce the tread of the tire to a pulverized form which can be removed and subsequently used. The remaining tire bead is then cut in two and a swing finger means is adapted to throw the tire bead down a chute.

A tire detreading apparatus is disclosed in U.S. Pat. No. 1,745,021 (Liebau). This device includes a manually controlled device which is adjustable to receive tires of various sizes and to enable a quick and easy mounting of a tire thereon. Adjustment for tires of various sizes is provided by radially movable fingers which grip the rim of the tire and which are actuated by a disc including a series of spiral grooves. The cutter for the bead of the tire is also movable by manual operation into and out of engagement with the tire.

Other U.S. patents which disclosed tire detreating apparatus or the like includes the following: U.S. Pat. No. 2,065,448 (George); U.S. Pat. No. 2,283,005 (Godfrey, Jr); U.S. Pat. No. 3,731,884 (Tupper et al); and U.S. Pat. No. 3,604,084 (Krieger).

SUMMARY OF THE INVENTION

In accordance with the present invention, an automatic apparatus for removing the tread from beads of various size tires is provided. The apparatus includes a tire centering means for vertically orienting the tire so that the radial center axis of the tire is positioned along a horizontal reference axis. The tire centering means includes a catch box having an open top through which an upright tire is admitted, a back wall, a front wall, a left side wall, a right side wall, and an open bottom in which a bottom support means is located for centering the tire between the two side walls. The catch box also includes a side moving means for moving the side walls inwardly toward the tire centered on the bottom support means and a bottom moving means for moving the bottom support means upwardly at the same time and at the same rate at which the side walls are moved towards each other. A stop means is provided for stopping movement of the side moving means and bottom moving means when both the side walls are immediately adjacent the tire. The catch box further includes an erector means for holding the tire flat against the back wall after the side walls have stopped moving so that the radial center axis of the tire is positioned along the horizontal reference axis. Finally, a front moving means is provided for moving the front wall of the catch box from in front of the tire.

The apparatus also includes a tire gripping means for gripping the rim of the tire and a tire moving means for moving the catch box relative to the tire gripping means along the horizontal reference axis so that the tire gripping means engages the tire in the catch box and subsequently the tire and tire gripping means are separated from the catch box. A tire cutting means is then provided for cutting the tread from the bead of the tire and a tire ejecting means is provided for ejecting the remaining bead of the tire from the tire gripping means.

In a preferred embodiment of the present invention, the bottom support means includes two plates which are inclined slightly towards one another and located on opposite sides of the catch box so that the tire is centered between the side walls on the two plates as the tire rests on the two plates. Conveniently, the bottom moving means then includes a support for the two plates, a cam attached to a respective side wall, and a cam follower attached to the support and adapted to follow the cam so that the side walls and support move in unison. In addition, the side moving means includes a linkage means connected to both of the side walls for controlling the movement of the side walls so that the side walls move in unison toward or away from the horizontal reference axis. The stop means also includes a switch located adjacent one of the side walls which is actuated when the tire contacts the side wall.

In the preferred embodiment, the erector means includes two erector members disposed parallel and adjacent to the front wall and adjacent a respective side wall, and an erector moving means for moving the erector member toward and away from the back wall. The erector members are further resiliently mounted to the erector moving means so that the tire can be pulled past the erector members by the tire moving means In addition, the front moving means includes a lifting means for lifting the front vertically above the tire. In order to initiate action of the tire centering means, a switch means is also provided which is located in the open bottom and which is contacted by a tire entering the catch box.

According to the preferred embodiment, the tire gripping means includes a plurality of fingers located equidistantly about the horizontal reference axis and disposed parallel to the horizontal reference axis. A finger moving means is provided for selectively moving the fingers radially from said horizontal reference axis in order to engage and grip the rim of the tire with the fingers. Preferably, the finger moving means includes a circular plate coaxial with the reference axis, a ring located coaxially about the circular plate, and a mounting means for mounting the circular plate and the ring for relative rotational movement. A plurality of arcuate slots are then provided in the circular plate arranged about the center of the plate with a respective finger slidably mounted therein. The fingers are then connected to the ring by a suitable connecting means and a rotating means is provided for rotating the ring and the circular plate relative to one another so that upon rotation in one direction the fingers move in respective slots away from the reference axis and upon rotation in the other direction the movement of the fingers is reversed. Conveniently, the rotating means includes a means for rotating the circular plate and a brake means for relatively preventing rotation of the ring.

Preferably, the tire cutting means includes a cutting device and a cutter moving means for radially moving the cutting device into engagement with the tire after mounting of the tire on the fingers. The cutter moving means preferably includes a positioning means for positioning the cutting device at a predetermined radial distance away from the adjacent finger. A limit means is also provided for preventing the cutting device from ever contacting the fingers and thereby damaging the fingers or the cutting device. In order to cut the tread from the bead, a rotating means is also provided for rotating the tire somewhat more than one revolution as the cutting means engages the bead portion of the tire.

The tire ejecting means preferably includes a pusher means for pushing the tire horizontally off of the fingers after the tread has been stripped from the bead. Conveniently, the pusher means includes a plurality of pusher members which are mounted for movement on a respective finger. A pusher moving means is then used for moving each pusher member along the respective fingers in unison whereby the tire be pushed from the fingers. The pusher means also returns the pusher members to the beginning position after ejection of the tire.

In the preferred form, the catch box includes a main chasis which is movable by the tire moving means parallel to the horizontal reference axis. A left frame and a right frame are then provided on which the left side wall and right side wall are respectively mounted. A frame mounting means is also provided for mounting the left frame and right frame for horizontal movement on the chasis in a direction perpendicular to the horizontal reference axis. The back wall preferably also includes a left back portion and a right back portion attached respectively to the left frame and right frame and movable therewith.

It is a feature of the present invention that an automatic apparatus for removing the tread from the bead of a tire in shreds is provided. It is also a feature of the present invention that various sized tires are automatically operated on without need for adjusting the apparatus for each differently sized tire.

It is an object of the present invention to produce a shredded tread which is usable as a rubber particulate product. It is also an object of the present invention to remove the tread from the bead of the tire so that the remaining bead of the tire is more easily disposed of.

It is a further object of the present invention to make the recovery of the steel from a steel belted tire easier and more economical by first removing the tread therefrom so that the remaining rubber is more easily burned away from the steel.

Other features and objects of the present invention are stated in or apparent from a detailed description of a presently preferred embodiment of the invention found hereinbelow.

DETAILED DESCRIPTION OF THE PREFERRED EMBODIMENTS

Figure 1:
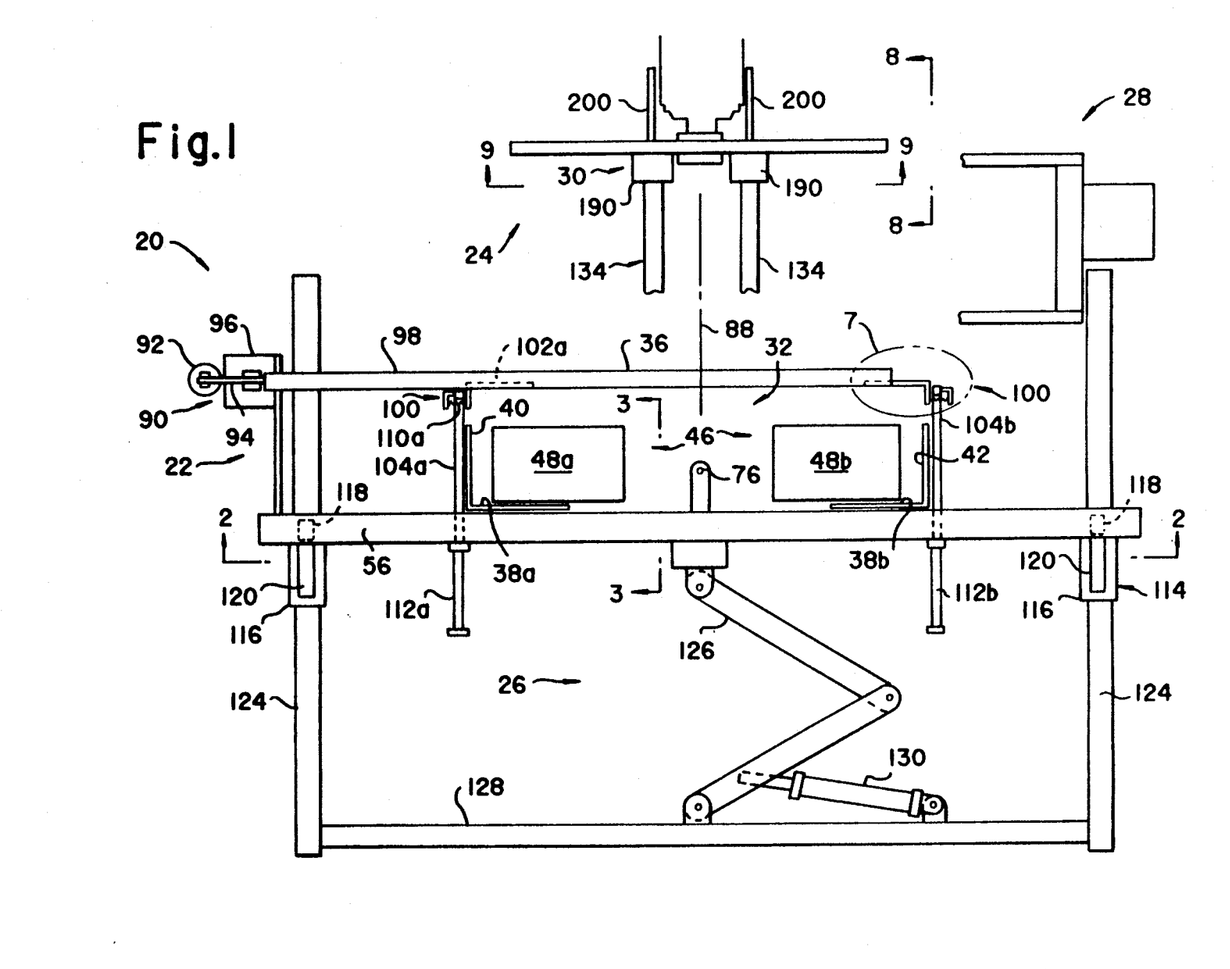
FIG. 1 is a schematic top plan view of the tread removal apparatus of the present invention.

With reference now to the drawings in which like numerals represent like elements throughout the several views, a presently preferred embodiment of a tread removal apparatus 20 of the present invention is depicted schematically in FIG. 1. Generally speaking, tread removal apparatus 20 includes a tire centering means 22 for initially orienting a tire T, a tire gripping means 24 which grips tire T after tire T has been centered by tire centering means 22, a tire moving means 26 which moves the centered tire T and tire centering means 22 into position to be gripped by tire gripping means 24, a tire cutting means 28 which cuts the tread from tire T mounted on tire gripping means 24, and a tire ejecting means 30 which ejects the detreaded tire T from tire gripping means 24.

Figure 2:
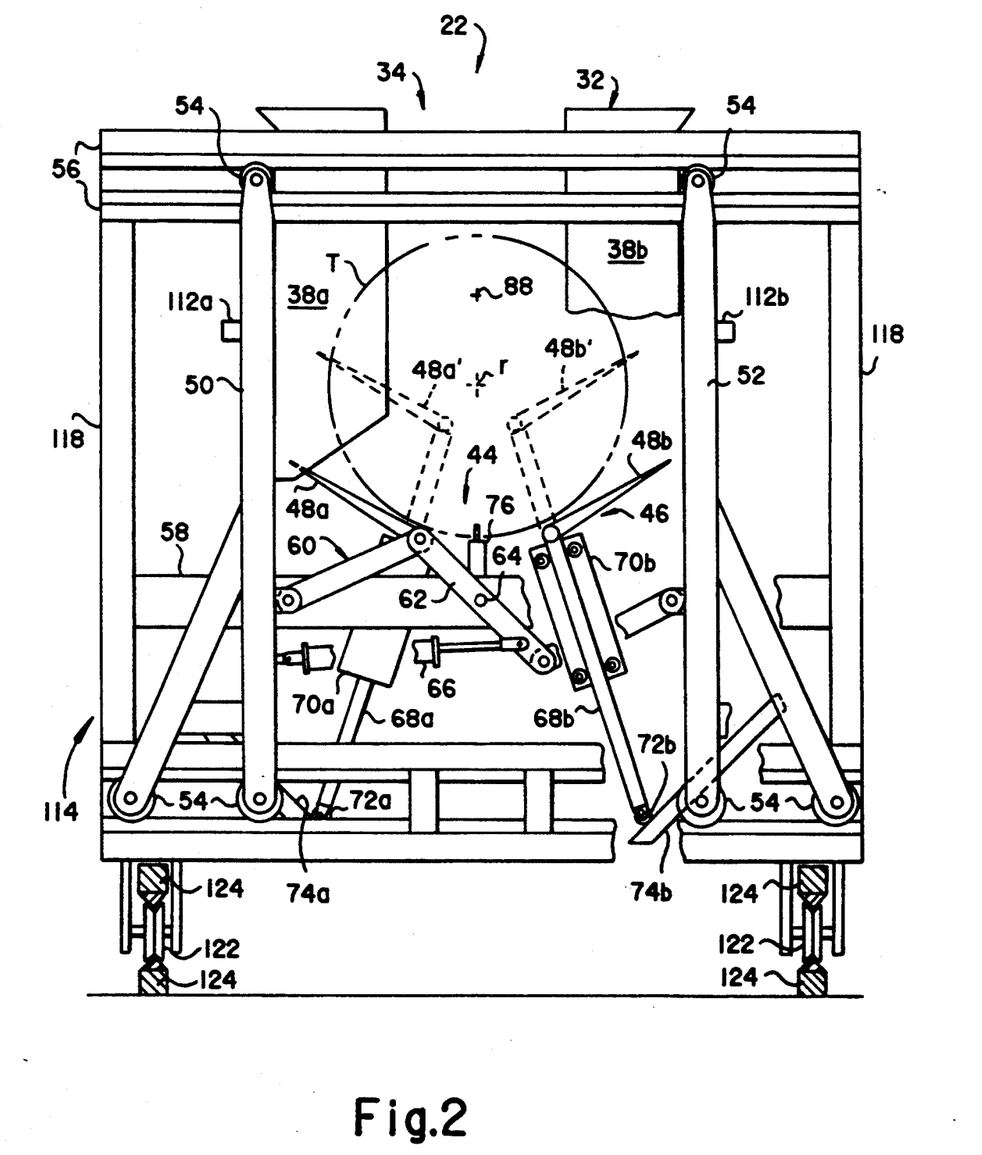
FIG. 2 is a schematic back elevation view of the catch box of the present invention as viewed from the line 2—2 in FIG. 1.
Figures 3, 4:
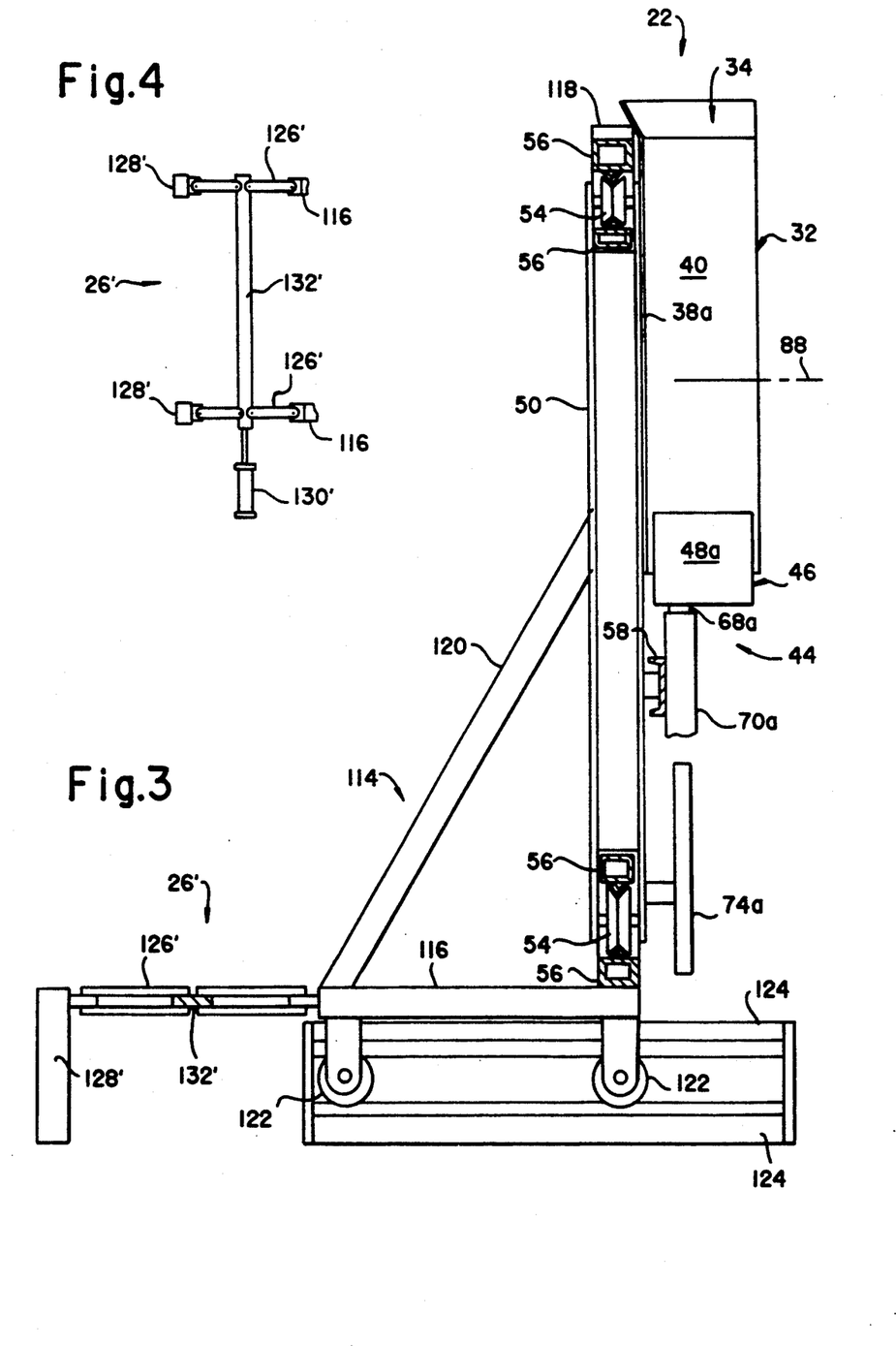
FIG. 3 is a schematic left side view of a portion of the catch box as viewed from the line 3—3 in FIG. 1.
FIG. 4 is a schematic top plan view of an alternative moving means for the catch box.

As shown in greater detail in FIGS. 2 and 3, tire centering means 22 includes a catch box 32 in which tire T is initially deposited. Catch box 32 includes an open top 34 through which tire T is initially dropped in an upright orientation (i.e., with the radial center axis of tire T horizontal). Catch box 32 also includes a front wall 36, a back wall comprised of a left back wall portion 38a and a right back wall portion 38b, a left side wall 40, and a right side wall 42. The top portions of back wall portions 38a and 38b and side walls 40 and 42 are flared outwardly as shown to more readily admit tire T into catch box 32.

Catch box 32 also includes an open bottom 44 in which a bottom support means 46 is provided. Bottom support means 46 includes bottom plates 48a and 48b which are inclined toward one another and are best shown in FIG. 2.

In the preferred embodiment, back wall portion 38a and left side wall 40 are joined together and are mounted on a left frame 50. In a similar manner, back wall portion 38a and right side wall 42 are mounted on a right frame 52. As shown best in FIG. 2, left frame 50 is mounted for left to right movement by wheels 54 which engage transverse tracks 56. Right frame 52 is similarly mounted. In addition, a transverse beam 58 is provided intermediate transverse tracks 56. Attached to left frame 50 and right frame 52 is a linkage means 60. The middle link 62 of linkage means 60 is pivotally mounted about a center pivot 64 to transverse beam 58. A pneumatic actuator 66 is attached near one end of middle link 62 and at the other end to left frame 50. By actuation of pneumatic actuator 66, middle link 62 is moved so that linkage means 60 moves both left frame 50 and right frame 52 together along transverse tracks 56.

As shown best in FIG. 2, bottom plates 48a and 48b are designed to move upwardly as shown by phantom bottom plates 48a' and 48b'. As both bottom plate 48a and 48b move in a similar manner, only the mechanism for moving bottom plate 48b will be described in detail. Bottom plate 48b is connected to a rod 68b extending through a rod guide 70b attached to transverse beam 58. At the opposite end of rod 68b a cam follow wheel 72 is provided. Cam follower wheel 72 rides along a cam bar 74b attached to right frame 52. As is readily appreciated from the drawings, as right frame 52 and cam bar 74b are moved to the left, rod 68b rises and thereby lifts bottom plate 48b. The similar elements for raising bottom plate 48a are identified in the drawings with the same numeral and with an "a" suffix.

It should be appreciated that cam bars 74a and 74b are attached respectively to frames 50 and 52, and thus move with frames 50 and 52. The angles of cam bars 74a and 74b are designed so that bottom plates 48a and 48b rise at the same rate at which frames 50 and 52 move towards one another under actuation of pneumatic actuator 66.

Figure 6:
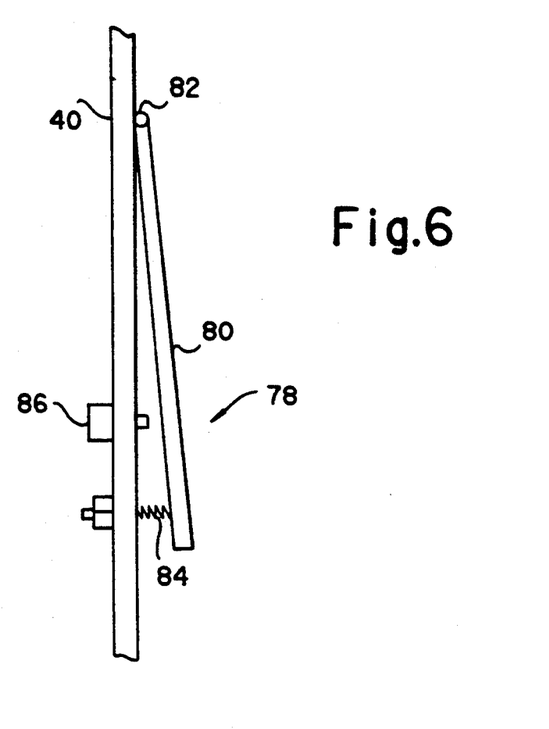
FIG. 6 is a schematic front elevation view of a portion of the right side wall of the catch box.

Extending from transverse beam 58 into open bottom 44 is an actuator switch 76. Actuator switch 76 is depressed upon entry of tire T into catch box 22 to initiate the closing action of pneumatic actuator 66. In order to stop the actuation of pneumatic actuator 66 when walls 40 and 42 are immediately adjacent tire T, one or both of walls 40 and 42 includes a stop means 78 as depicted in FIG. 6. Stop means 78 includes a stop plate 80 pivotally mounted to one side wall, for example, left side wall 40 at pivot 82. A spring member 84 holds the opposite end of stop plate 80 slightly away from left side wall 40. A stop plunger switch 86 is located above spring member 84 and is actuated when stop plate 80 contacts tire T and pivots about pivot 82 into closing contact with stop plunger switch 86. Upon actuation of stop plunger switch 86, where a single stop means 78 is used, the actuation of pneumatic actuator 66 is immediately stopped. Where two stop means 78 is used, one on each side wall 40 and 42, pneumatic actuator 66 stops upon actuation of both stop means.

It should be appreciated that the purpose of tire centering means 22 is to move the radial center axis r of tire T to a horizontal reference axis 88. As shown in FIG. 2, when tire T is initially dropped into catch box 22, actuator 76 is actuated to power pneumatic actuator 66. This causes linkage means 60 to move frames 50 and 52 toward one another at the same time that bottom plates 48a and 48b move upwardly. Because tire T is initially centered on bottom plates 48a and 48b, radial center axis r of tire T is initially somewhere below horizontal reference axis 88. Thereafter, because tire T and radial center axis r are raised by bottom plates 48a and 48b by the same distance which frames 50 and 52 move inwards towards one another, radial center axis r coincides with horizontal reference axis 88 when the sides of tire T contact side walls 40 and 42. When this occurs, stop means 78 is immediately actuated to stop the movement of pneumatic actuator 66 so that as the coincidence of horizontal reference axis 88 and radial center axis r is maintained.

Figure 5:
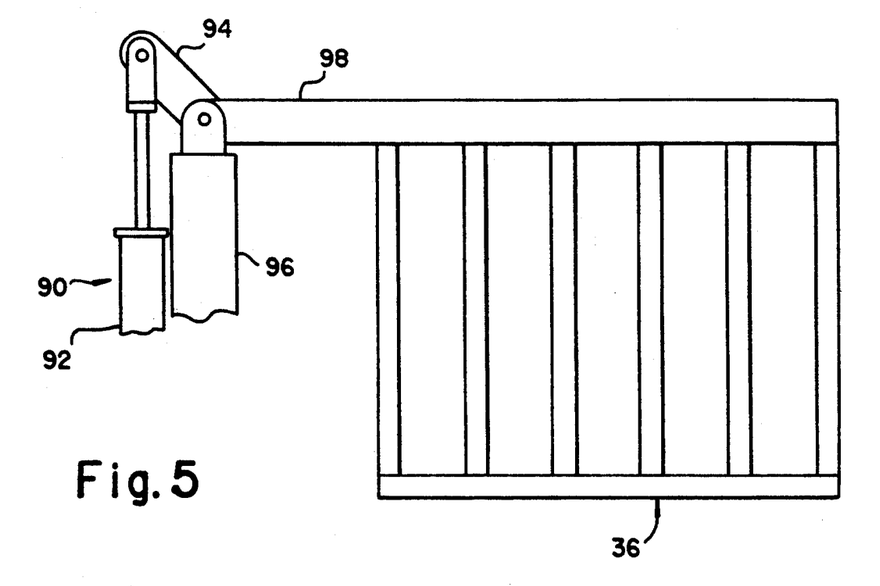
FIG. 5 is a schematic back elevation view of the front wall of the catch box.

In order for tire gripping means 24 to grip tire T, front wall 36 must be moved from in front of tire T. In order to accomplish this, a front moving means 90 is provided as depicted in FIG. 5. Front moving means 90 includes a pneumatic actuator 92 which is attached at one end to a lever arm 94. Lever arm 94 is pivotally mounted to a beam 96. Lever arm 94 is also rigidly attached to an extension 98 leading from front wall 36. Upon actuation of pneumatic actuator 92 to pull lever arm 94 downwards, front wall 36 is correspondingly lifted above tire T.

In order to hold tire T flat against back wall portions 38a and 38b and to retain tire T in catch box 22 after front wall 36 is raised, an erector means 100 is used. Erector means 100 includes a left erector member 102a and a right erector member 102b. As erector members 102a and 102b include similar elements and operate in a similar manner, only erector member 102b and the associated elements will be described in detail with the similar elements of erector member 102a identified with the same identifying numeral and a suffix "a".

Figure 7:
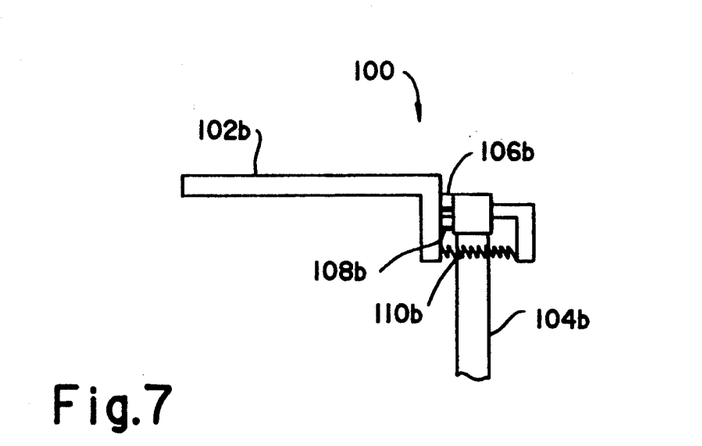
FIG. 7 is a top plan view of a portion of the right side erector means circled by the line identified with number 7 in FIG. 1.

Erector member 102b is shown in greater detail in FIG. 7. As shown, erector member 102b is pivotally connected to a piston rod 104b at pivot 106b. A stop 108b prevents erector member 102b from pivoting beyond a position where erector member 102b is substantially parallel to back wall portion 38b. In addition, a spring means 110b resiliently holds erector member 102b against stop 108b.

As mentioned above, erector member 102b is attached to piston rod 104b. As shown in greater detail in FIG. 1, piston rod 104b extends from a pneumatic actuator 112b. Pneumatic actuator 112b is attached to right frame 52 so that erector member 102b travels with right frame 52. As also shown in FIG. 1, erector member 102b is located just inside of front wall 36.

After tire T is centered in catch box 22 by tire centering means 22, erector means 100 is actuated. Conveniently, erector means 100 is actuated by stop plunger switch 86 of stop means 78. Upon actuation of erector means 100, pneumatic actuator 112b is operated to withdraw piston rod 104b back toward back wall portion 38b. As this occurs, erector member 102b engages the side of tire T and pulls tire T flat against back wall portion 38b. Similarly, erector member 102a pulls the left side of tire T against back wall portion 38a. At this time, pneumatic actuators 112a and 112b are stopped and front wall 36 appropriately lifted out of the way of tire T.

It should be appreciated that erector members 102a and 102b resiliently hold tire T against back wall portions 38a and 38b. However, erector members 102a and 102b do not extend beyond the inner rim of any size of tire T. Thus, after tire gripping means 24 has gripped the rim of tire T, tire T can be withdrawn from catch box 32 past erector members 102a and 102b if sufficient force is applied. Once sufficient force is applied by tire gripping means 24, it can be seen that erector member 102b pivots against the force of spring means 110b about pivot 106b as tire T is withdrawn from catch box 32.

In order to move tire gripping means 24 into engagement with tire T located in catch box 32, it is necessary to move one or the other of tire gripping means 24 or catch box 32 along horizontal reference axis 88. In the preferred embodiment of the present invention, catch box 32 is moved towards tire gripping means 24. In order to accomplish this, tire centering means 22 is mounted on a main chasis 114. As shown in FIG. 3, main chasis 114 includes a base portion 116, upright members 118, and braces 120. It should be appreciated that transverse tracks 56 and transverse beams 58 are mounted between opposite upright members 118 as shown in FIG. 2. In addition, beam 96 of stop moving means 90 is also attached to upright member 118 by tracks 56. Main chasis 114 is movably mounted by wheels 122 on longitudinal tracks 124. It should be appreciated that longitudinal tracks 124 are parallel to horizontal reference axis 88.

As mentioned above, main chasis 114 is moved along horizontal reference axis 88 toward tire gripper means 24 in order to cause tire T in catch box 32 to be gripped by tire gripping means 24. To accomplish this, tire moving means 26 is used. As depicted in FIG. 1, tire moving means 28 includes a linkage 126 which is connected to the lower set of tracks 56 of tire centering means 22 and to a stationary beam 128. A pneumatic actuator 130 is also attached to beam 128 and to linkage 126 as shown. When pneumatic actuator 130 is actuated, linkage 126 is moved towards a straightened position and hence causes main chasis 114 to travel along tracks 124. Thus, catch box 32 is similarly moved along horizontal reference axis 88 toward tire gripping means 24.

An alternative embodiment of a tire moving means is tire moving means 26' depicted in FIGS. 3 and 4. In tire moving means 26', two linkages 126' are attached to a respective base portion 116 of main chasis 114. The other end of linkages 126' are attached to a stationary beam 128'. Finally, a pneumatic actuator 130' is used to move linkages 126' by means of cross member 132' which connects linkages 126' as shown in FIG. 4. Pneumatic actuator 130' thus causes main chasis 114 to move smoothly in a similar manner as pneumatic actuator 130 described above.

Figure 8:
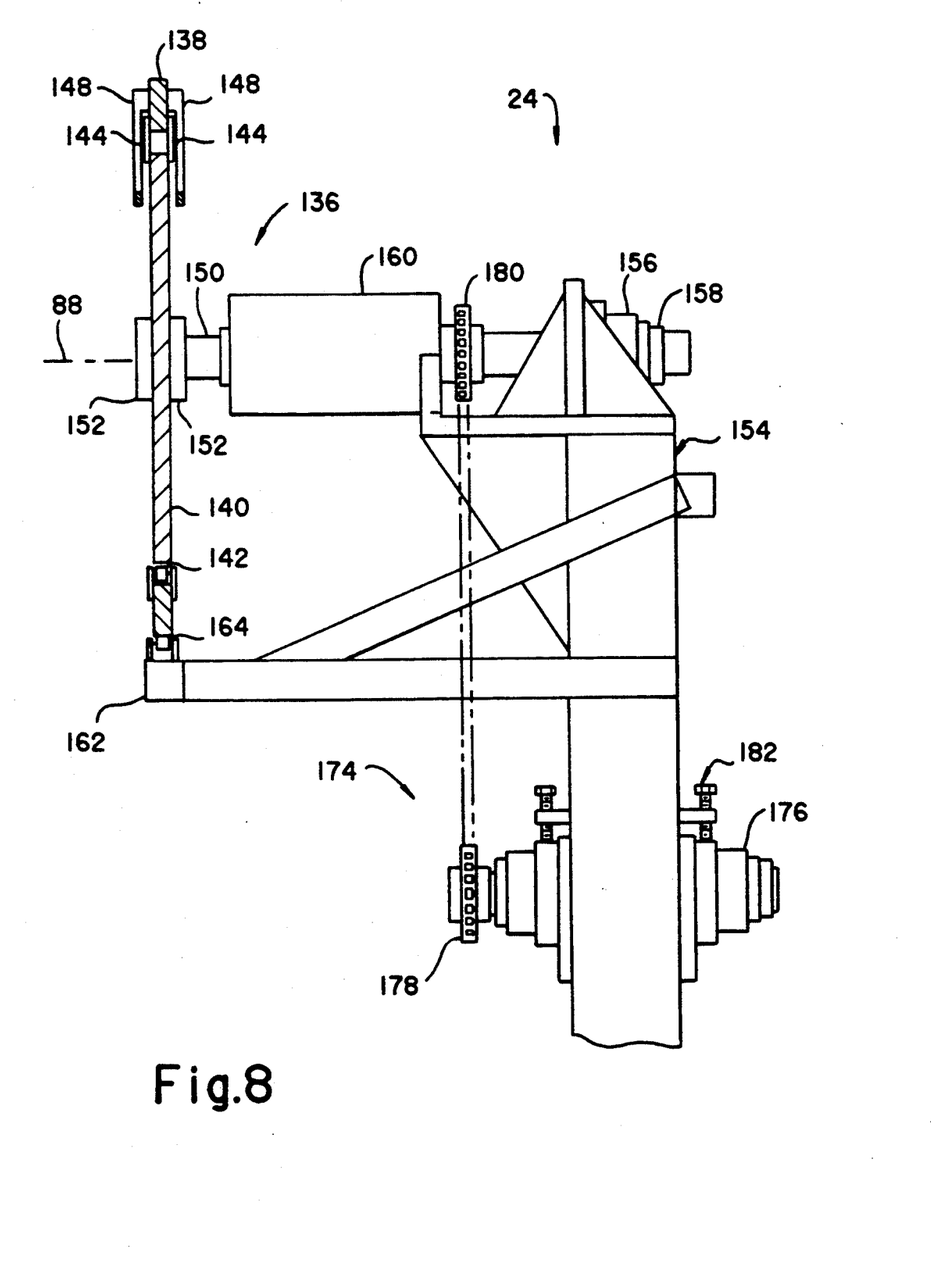
FIG. 8 is a schematic right side elevation view of the tire gripping means of the present invention as viewed along the line 8—8 in FIG. 1.
Figure 9:
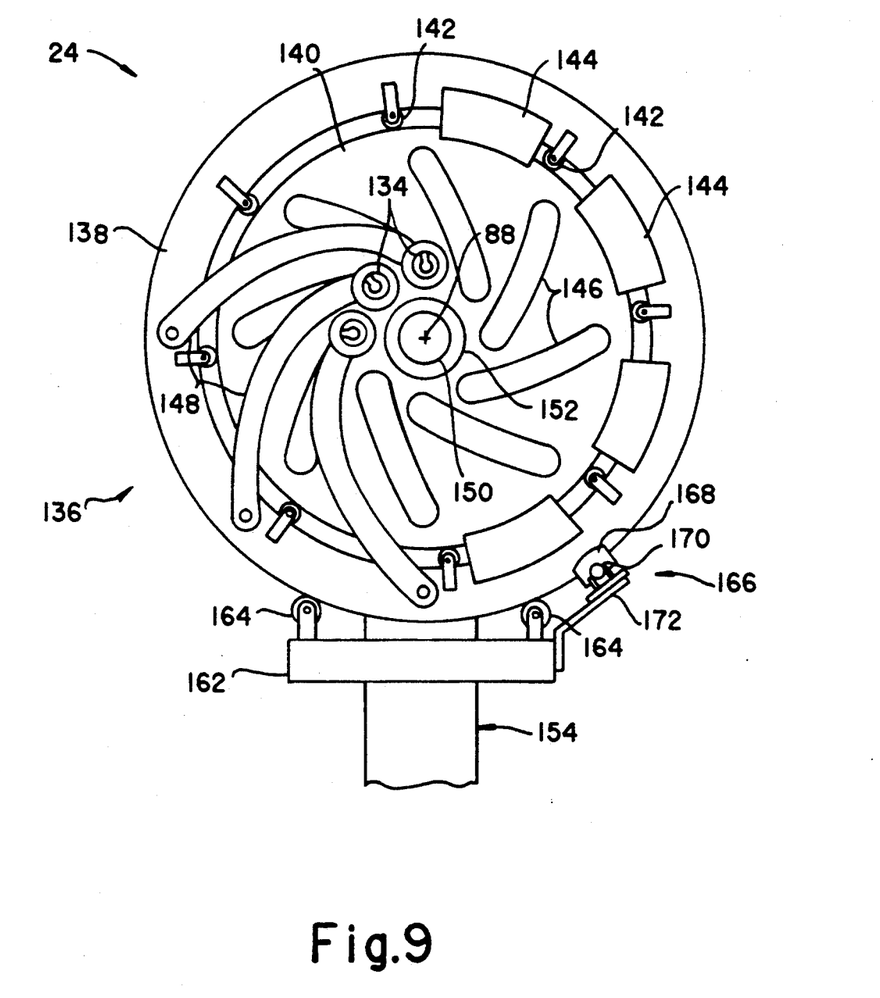
FIG. 9 is a schematic front elevation view of the tire gripping means depicted in FIG. 8 as viewed along the line 9—9 in FIG. 1.

In addition to FIG. 1, reference is made to FIGS. 8 and 9 in which tire gripping means 24 is shown in additional detail. As shown in these figures, tire gripping means 24 includes a plurality of fingers 134 (not shown in FIG. 8 for clarity) which are parallel to horizontal reference axis 88 and arranged in a circle around horizontal reference axis 88. Fingers 134 are radially moved relative to the horizontal reference axis by a finger moving means 136 so that fingers 134 engage and hold the rim of tire T which is initially located about fingers 134 in catch box 32 as described above.

Finger moving means 136 includes a ring 138 and a circular plate 140. As shown, ring 138 and circular plate 140 are mounted for rotational movement relative to one another by rollers 142 and brass aligning plates 144. Brass aligning plates 144 are attached to ring 138 and which extend radially inward from ring 138 parallel to circular plate 140. It should be noted that brass aligning plates 144 extend around the circumference of ring 138 although a number of brass aligning plates have been omitted for clarity in the drawings.

As shown in FIG. 9, circular plate 140 includes a plurality of arcuate slots 146 arranged around the center of circular plate 140. Passing through each arcuate slot 146 is a finger 134 (some of which have been omitted for clarity). Each finger 134 is slidably mounted in the corresponding arcuate slot 146. Attached rotatably to each finger 134 is an arcuate link 148. The opposite end of arcuate links 148 are attached pivotally to ring 138 as shown. By relative rotation of ring 138 and circular plate 140, arcuate rings 148 cause fingers 134 to travel in arcuate slots 148 either toward or away from horizontal reference axis 88. The direction of movement of fingers 134 depends upon the relative rotational direction of movement of ring 138 and circular plate 140.

Finger moving means 136 also includes a shaft 150 on which circular plate 140 is mounted by collars 152. The longitudinal center axis of shaft 150 is coincident with horizontal reference axis 88 and is held in this position by support structure 154. Support structure 154 includes a mounting bearing 156 adjacent a collar 158 and a covered bearing member 160 adjacent circular plate 140. By use of mounting bearing 156 and covered bearing member 160, shaft 150 is easily rotatable relative to support structure 154. Support structure 154 also includes a platform 162 on which rollers 164 are provided. As shown best in FIG. 9, rollers 164 engage the lower portions of ring 138. In this manner, rollers 164 support the weight of ring 138 and circular plate 140 while allowing rotational movement of ring 138 about horizontal reference axis 88.

Also mounted to one side of platform 162 as shown in FIG. 9 is a brake means 166 for selectively preventing rotation of ring 138. Brake means 166 includes opposed brake pads 168 (only one of which is shown) and a pad operator 170 which brings brake pads 168 together against ring 138. Conveniently, brake means 166 is attached to platform 162 by a bracket 172.

Finger moving means 136 also includes a rotating means 174 for rotating shaft 150. Rotating means 174 includes a reversible motor means 176 which is mounted to support structure 154 below shaft 150. Mounting means 176 includes a sprocket 178 which is turned by motor means 176 and a sprocket 180 mounted to shaft 150. A chain 182 is received on sprockets 178 and 180 so that sprockets 178 and 180 turn in unison. A chain tightening means 184 is provided for attaching motor means 176 to support structure 154 adjustably in the vertical direction in order to tighten chain 182 between sprockets 178 and 180.

In operation, tire gripping means 24 functions in the following manner. Initially, fingers 134 are in the position depicted in FIG. 9 where fingers 134 are radially closest to shaft 150. Thereafter, brake means 166 is actuated to prevent rotation of ring 138. Next, motor means 176 is actuated to cause sprocket 178 and hence sprocket 180 to rotate. The rotation of sprocket 180 causes shaft 150 to also rotate and thereby rotate circular plate 140. The rotation of circular plate 140 causes fingers 134 to be pulled away from shaft 150 by arcuate links 148 attached to stationary ring 138. Where tire T is initially located around fingers 134, fingers 134 move radially outward to contact and grip the rim of tire T. Thereafter, when brake means 166 is released, rotating means 174 turns both ring 138 and circular plate 140 together with tire T attached thereto by fingers 34 so that the cutting of the tread from tire T is accomplished as explained subsequently.

Figure 10:
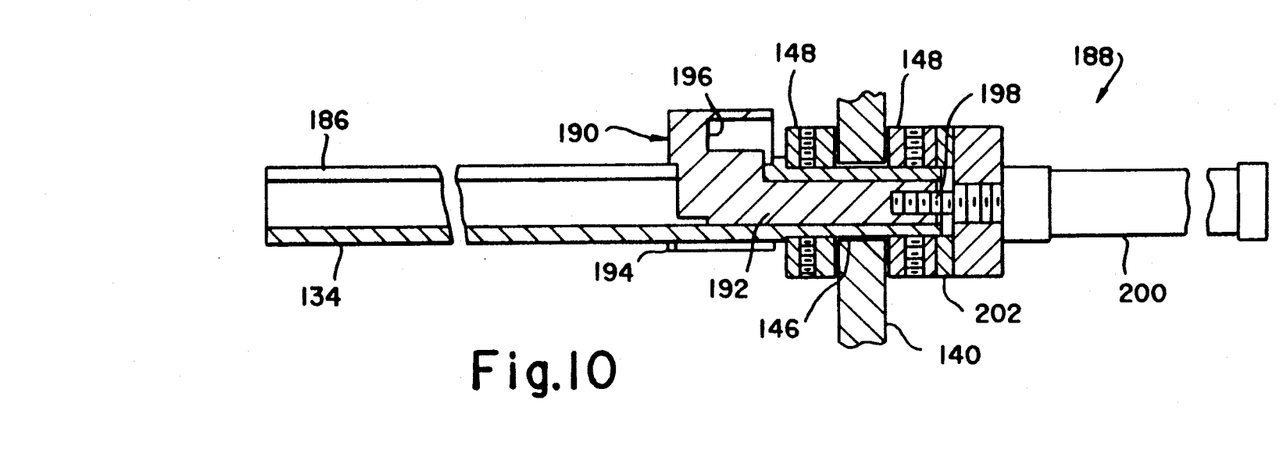
FIG. 10 is a cross-sectional side view of a finger and pusher means of the tire gripping means depicted in FIGS. 8 and 9.
Figure 11:
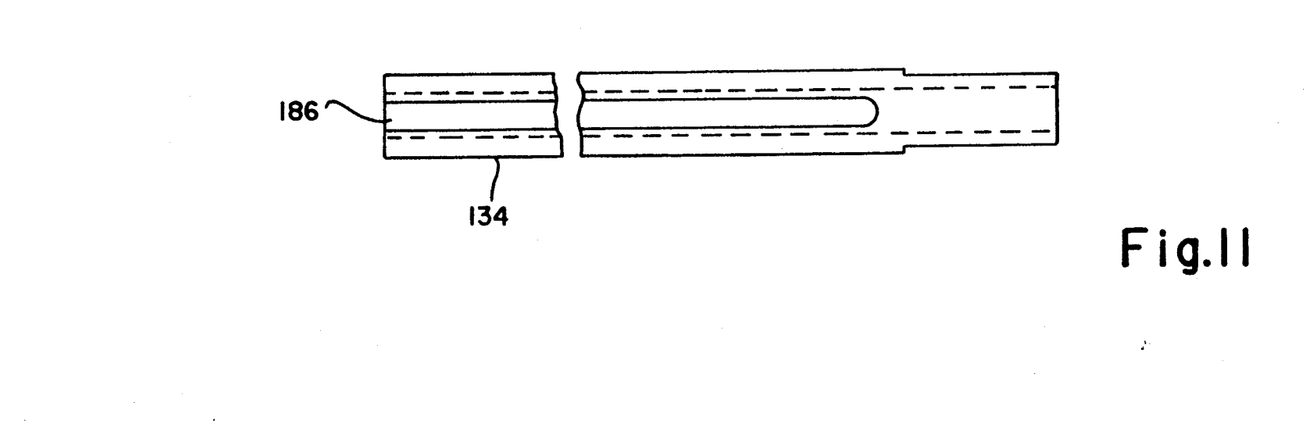
FIG. 11 is a top plan view of the finger depicted in FIG. 10.

One of fingers 134 is depicted in greater detail in FIGS. 10 and 11. As shown in these figures, finger 134 is tubular and includes a slot 186 at the outer radial side of finger 134. Mounted on each finger 134 is a pusher means 188 which pusher means together comprise tire ejector means 30. Pusher means 188 includes a pusher member 190. Pusher member 190 includes a cylindrical portion 192 located slidably inside of finger 134 and a U-shaped portion 194 extending around finger 134. A connecting portion 196 extending through slot 186 connects U-shaped portion 194 to cylindrical portion 192.

Cylindrical portion 192 of pusher member 190 is connected to a piston rod 198 of a pneumatic actuator 200. Pneumatic actuator 200 is attached to arcuate link 148 through a spacer 202.

In operation, pusher means 188 functions in the following manner to push a tire T off of finger 134. It should be appreciated that pusher means 188 is actuated after the tight grip of fingers 134 on the rim of tire T has been somewhat loosened. At this time, pneumatic actuator 200 is actuated to move piston rod 198 forward into finger 134. Pusher member 190 then pushes against the outside portion of the rim of tire T. In conjunction with the other pusher members of the other fingers 134, pusher members 190 thereby push tire T off of all of fingers 134.

It should be appreciated that pneumatic actuators 200 rotate with circular plate 140. Therefore, the fluid connections between pneumatic actuators 200 must also rotate in order to provide a source of fluid pressure for pneumatic actuators 200. According to the preferred embodiment of the present invention, shaft 150 is tubular and contains a suitable source of fluid pressure which is conveniently supplied by a rotating connection attached to the end of shaft 150 adjacent collar 158. Each fluid actuator 200 is then connected to the fluid pressure inside of shaft 150 and these connections thus rotate with shaft 150 and pneumatic actuators 200.

Figure 12:
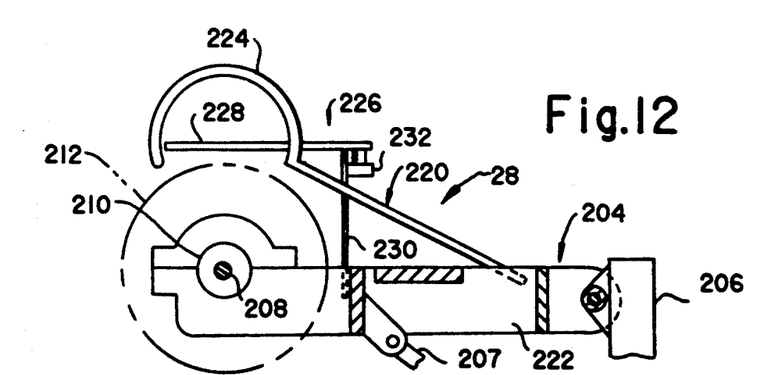
FIG. 12 is a schematic rear cross-sectional elevation view of the cutting device of the present invention.
Figure 13:
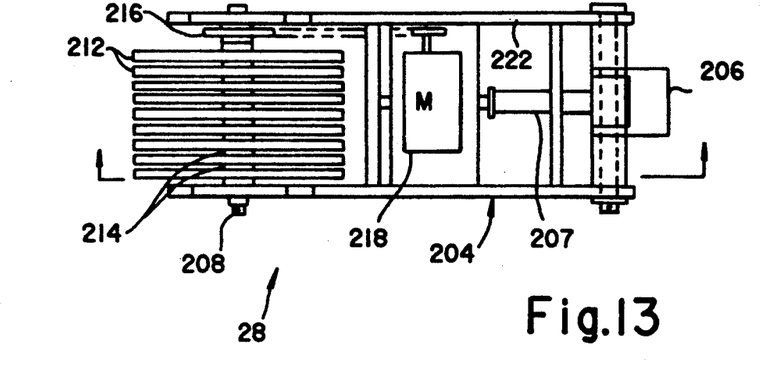
FIG. 13 is a schematic top plan view of the cutting device depicted in FIG. 12.

Depicted in FIGS. 12 and 13 is tire cutting means 28. Tire cutting means 28 includes a base 204 which is pivotally mounted to a beam 206. A pneumatic actuator 207 (only part of which is shown) is attached to beam 206 and to base 204 to raise and lower base 204.

Mounted to base 204 is a shaft 208. Shaft 208 is mounted between bearings 210 so as to rotate freely relative to base 204. Mounted on shaft 208 are a series of saw blades 212. Preferably, saw blades 212 have a 20 inch diameter and coarse carbide tips set laterally wide apart so that a wide cut is made thereby. In addition, the adjacent teeth of adjacent saw blades 212 overlap and are staggered circumferentially with respect to one another and spacers 214 are provided between saw blades 212. Also mounted at one end of shaft 208 is a suitable drive pulley 216. Drive pulley 216 is suitably driven by a drive motor 218 which is mounted on base 204.

As shown in FIG. 1, tire cutting means 28 is located adjacent fingers 134 of tire gripping means 24 so that tire cutting means 28 is located immediately below fingers 134. In this position, saw blades 212 are movable vertically upwards towards fingers 134. In order to properly position saw blades 212 at the proper location to cut the tread from tire T mounted on fingers 134, a limit stop 220 is attached to side 222 of base 204 as shown in FIG. 12. Limit stop 220 includes a semicircular portion 224 which is located at a height above saw blades 212 corresponding to the distance from fingers 134 to the bead of the tire T from which the tread is to be removed. Thus, as pneumatic actuator 207 raises base 204, semicircular portion 224 contacts fingers 134 and prevents base 204 and saw blades 212 from being raised any further. At this position, saw blades 212 are properly positioned to cut the tread from tire T while leaving the bead.

It should be appreciated that the distance from the rim of tire T to the bead is relatively standard for the various standard tire sizes. Consequently, where a particular limit stop 220 is used, only tires having that standard distance between rim and bead are fed to tread removal apparatus 20. However, limit stop 220 is easily made adjustable for the same number of standard heights of tires, or different replaceable limit stops 20 having different sized semicircular portions 224 can be used corresponding to the different standard distances of the tires.

In order to prevent saw blades 212 from ever contacting fingers 134, a limit switch 226 is provided as shown in FIG. 12. Limit switch 226 includes an arm 228 extending slightly above the height of saw blades 212 and just behind limit stop 220. Arm 228 is pivotally mounted to a support 230 on which a limit switch 232 is mounted. Arm 228 is pivotally mounted to support 230 so that upon contact of fingers 134, arm 228 is pivoted downwards and limit switch 232 is actuated to stop pneumatic actuator 207 from raising saw blades 212 any further. It should be appreciated that limit switch means 226 would only be actuated after a breakage of limit stop 220 or other malfunction.

In operation, tread removal apparatus 20 functions in the following manner. Initially, tread removal apparatus 20 is in the position depicted in FIG. 1. At this time, tire T is dropped vertically into catch box 34 from a suitable conveyor feed or manual feed. It should be appreciated that catch box 32 is large enough to accept a large variety of different sized tires, although a batch of tires having the same distance from apparatus 20 using the appropriate limit stop 220. Upon dropping to the bottom of catch box 34, actuator 76 is depressed to actuate tire centering means 22. Tire centering means 22 includes linkage means 60 powered by pneumatic actuator 62 which brings side walls 40 and 42 together towards horizontal reference axis 88 and tire T. At the same time, bottom support means 46 including bottom plates 48a and 48b move upwardly under the action of cam follower wheels 72a and 72b. When radial center axis r of tire T reaches horizontal reference axis 88, side walls 40 and 42 are just contacting the perimeter of tire T so that stop means 78 is actuated to stop actuation of pneumatic actuator 66. It should be appreciated that tire T is initially centered vertically between bottom plates 48a and 48b and that bottom plates 48a and 48b move up at the same rate and at the same time as side walls 40 and 42 move towards one another so that radial center axis r coincides with horizontal reference axis 88 when stop means 78 is actuated.

Upon the deactivation of pneumatic actuator 66, erector means 100 is actuated. This causes erector members 102a and 102b to be drawn toward respective back wall portions 38a and 38b by the action of pneumatic actuators 112a and 112b. Erector members 102a and 102b therefore pull tire T flat against back portions 48a and 48b and hold tire T resiliently thereagainst.

As erector means 100 is actuated, front moving means 90 is also actuated to lift front wall 36 out from in front of tire T. After front wall 36 is raised and erector members 102a and 102b have been pulled against tire T, tire moving means 26 is actuated. Tire moving means 26, through extension of pneumatic actuator 130, causes linkage 126 to straighten and move catch box 32 forward along longitudinal tracks 124. The movement of tire moving means 26 is stopped when back wall portions 38a and 38b are just slightly spaced from the ends of fingers 134. At this position, fingers 134 are located inside of the rim of tire T.

After the movement of tire moving means 26 has stopped, tire gripping means 24 is actuated. This causes brake means 166 to engage ring 138 of finger moving means 136. Next, motor means 176 is actuated to rotate sprocket 180 and shaft 150. This causes circular plate 140 to similarly rotate. As circular plate 140 rotates relative to ring 138, fingers 134 are pulled along arcuate slots 146 by arcuate links 148. The rotation of motor means 176 continues until fingers 134 positively engage the rim of tire T. This can be sensed by the resistance to movement of shaft 150 by motor means 176.

After tire T is gripped by fingers 134, tire moving means 26 is again actuated but in the reverse direction so as to withdraw catch box 32 away from tire gripping means 24. As this occurs, erector members 102a and 102b are pivoted parallel to horizontal reference axis 88 as catch box 32 is moved away from tire T. Once clear of tire T, erector members 102a and 102b return to the position depicted in FIG. 1 by the action of spring means 110a and 110b.

After catch box 32 is clear of tire T, tire cutting means 28 is actuated to begin rotation of saw blades 212 and to move base 204 upwards by means of pneumatic actuator 207 until saw blades 212 contact and cut into the tread of tire T. It should be appreciated that saw blades 212 are raised until semicircular portion 224 of limit stop 220 contacts whichever finger 134 is adjacent thereto. As mentioned above, limit stop 220 is chosen to correspond to the standard height for the tire to be detreaded.

After positioning of tire cutting means 128, brake means 166 is released and motor means 176 causes tire T together with circular plate 140 and ring 138 to rotate approximately 380°. As this occurs, saw blades 212 cut or shred all of the tread from the bead of tire T.

After the tread is cut from tire T, tire cutting means 28 is lowered by pneumatic actuator 207. Thereafter, brake means 166 is again actuated to hold ring 138 stationary and motor means 176 is reversed to return fingers 134 to the inner position of arcuate stops 146. At the same time that motor means 176 is reversed to release fingers 134 from their grip of tire T, tire ejector means 30 is actuated. By means of the various pneumatic actuators 200, pusher members 190 on fingers 134 are moved towards the end of fingers 134 and thereby push tire T off of fingers 134. The detreaded tire T is then removed from the area by a suitable conveyor, chute, or manually as desired. Once fingers 134 are returned to the central position, tire gripping means 24 is again prepared to receive a new tire T to be detreaded.

It should be appreciate that as the tread is being cut from one tire T by tire cutting means 28, a new tire T can be fed to catch box 32 as soon as front wall 36 is returned to the down position by front moving means 90 and side walls 40 and 42 and bottom plates 48a and 48b are returned to their starting positions. Thus, in the preferred embodiment, a new tire T is fed to catch box 32 as a tire T is being detreaded by tire cutting means 28. Therefore, as soon as tire ejector means 30 has removed the tire from fingers 134, tire moving means 26 is again actuated to position the new tire T to be gripped by fingers 134.

While the present invention has been described with respect to a exemplary embodiments thereof, it will be understood by those of ordinary skill in the art that variations and modification can be effected within the scope and spirit of the invention.

We claim:

1. An automatic apparatus for removing tread from beads of various sized tires, comprising:

a tire centering means for vertically orienting the tire such that the radial center axis of the tire is positioned along a horizontal reference axis, said tire centering means including
  (a) a catch box having an open top through which an upright tire is admitted into said catch box, a back wall, a front wall, a left side wall, a right side wall, and an open bottom in which a bottom support means is located for centering the tire between said two side walls,
  (b) a side moving means for moving said side walls inwardly toward the tire centered on said bottom support means,
  (c) a bottom moving means for moving said bottom support means upwardly at the same time and at the same rate at which said side walls are moved toward each other by said side moving means,
  (d) a stop means for stopping the movement of said side moving means and said bottom moving means when both said side walls are immediately adjacent the tire,
  (e) an erector means for holding the tire flat against said back wall after said side walls have stopped moving such that the radial center axis of the tire is positioned along the horizontal reference axis, and
  (f) a front moving means for moving said front wall from in front of the tire;
a tire gripping means for gripping the rim of the tire;
a tire moving means for moving one of said catch box and said tire gripping means relative to one another along the horizontal reference axis whereby said tire gripping means engages the tire in said catch box and subsequently the tire and said tire gripping means are separated from said catch box;
a tire cutting means for cutting the tread from the bead of the tire; and
a tire ejecting means for ejecting the remaining bead of the tire from said tire gripping means.

2. An apparatus for removing tread as claimed in claim 1 wherein said bottom support means includes two bottom plates which are located on opposite sides of a vertical plane through the reference axis and which are inclined slightly toward one another such that the tire is centered as the tire rests on both said bottom plates.

3. An apparatus for removing tread as claimed in claim 1 wherein said bottom moving means includes: a support for said bottom support means; a cam attached to one of said side walls; and a cam follower attached to said support and adapted to follow said cam such that said side walls and said support move in unison.

4. An apparatus for removing tread as claimed in claim 1 wherein said side moving means includes a linkage means connected to both of said side walls for controlling the movement of said side walls such that said side walls move in unison toward or away from the horizontal reference axis.

5. An apparatus for removing tread as claimed in claim 1 wherein said stop means includes a switch located adjacent one of said side walls which is actuated when the tire contacts said one of said side walls.

6. An apparatus for removing tread as claimed in claim 5 wherein said stop means further includes another switch located adjacent the other of said side walls which is actuated when the tire contacts said other of said side walls such that said stop means is actuated only after both of said switches are actuated.

7. An apparatus for removing tread as claimed in claim 1 wherein said erector means includes: two erector members, each said erector member being disposed parallel and adjacent to said front wall and adjacent a respective said side wall; and an erector moving means for moving said erector member towards and away from said back wall.

8. An apparatus for removing tread as claimed in claim 7 wherein said erector means further includes an erector mounting means for resiliently mounting said erector members to said erector moving means.

9. An apparatus for removing tread as claimed in claim 1 wherein said front moving means includes a lifting means for lifting said front wall vertically above the tire.

10. An apparatus for removing tread as claimed in claim 1 wherein said tire centering means includes a switch means located in said open bottom which is contacted by a tire entering said catch box for initiating actuation of said side moving means and said bottom moving means.

11. An apparatus for removing tread as claimed in claim 1 wherein said tire gripping means includes: a plurality of fingers located equidistantly about the horizontal reference axis and disposed parallel to the horizontal reference axis; and a finger moving means for selectively moving said fingers radially away from said horizontal reference axis whereby the rim of the tire is engaged and gripped by said fingers.

12. An apparatus for removing tread as claimed in claim 11 wherein said finger moving means includes: a circular plate coaxial with the reference axis; a ring located coaxially about said circular plate; a mounting means for mounting said circular plate and said ring for relative rotational movement; a plurality of arcuate slots in said circular plate arranged about the center of said circular pate with a respective said finger slidably mounted in a respective said slot; a connecting means for connecting respective said fingers to said ring; and a rotating means for rotating said ring and said circular plate relative to one another such that upon rotation in one direction said fingers move in respective said slots away from the reference axis and upon rotation in the other direction the movement is reversed.

13. An apparatus for removing tread as claimed in claim 12 wherein said rotating means includes: a means for rotating said circular plate; and a brake means for selectively preventing rotation of said ring.

14. An apparatus for removing tread as claimed in claim 11 wherein said tire moving means moves said catch box and centered tire into a position where the rim of said tire is engaged by the subsequent movement of said fingers.

15. An apparatus for removing tread as claimed in claim 14 wherein said tire cutting means includes: a cutting device; and a cutter moving means for radially moving said cutting device into engagement with the tire after mounting on said fingers.

16. An apparatus for removing tread as claimed in claim 15 wherein said cutter moving means includes a positioning means for positioning said cutting device a predetermined radial distance away from the adjacent said finger.

17. An apparatus for removing tread as claimed in claim 16 wherein said cutter moving means further includes a limit means for preventing said cutting device from contacting said fingers.

18. An apparatus for removing tread as claimed in claim 16 wherein said tire cutting means further includes a rotating means for rotating the tire at least one revolution.

19. An apparatus for removing tread as claimed in claim 11 wherein said tire ejecting means includes a pusher means for pushing the tire horizontally off of said fingers.

20. An apparatus for removing tread as claimed in claim 19 wherein said pusher means includes a plurality of pusher members mounted for movement on respective said fingers, and a pusher moving means for moving said pusher members back and forth along respective said fingers in unison.

21. An apparatus for removing tread as claimed in claim 1 wherein said catch box further includes: a main chasis which is movable by said tire moving means along the horizontal reference axis; a left frame and a right frame on which said left side wall and said right side wall are respectively mounted; and a frame mounting means for mounting said left frame and said right frame for horizontal movement on said chasis in a direction perpendicular to the horizontal reference axis; and wherein said back wall includes a left back portion and a right back portion attached respectively to said left frame and said right frame and movable therewith.

22. An apparatus for removing treads from beads of various sized tires, comprising:
  a tire centering means for vertically orienting the tire such that the radial center axis of the tire is positioned along a horizontal reference axis, said tire centering means including
  (a) a catch box including a main chasis, an open top through which an upright tire is admitted into said catch box, a front wall, a left side wall and a right side wall, a left frame and a right frame on which said left side wall and said right side wall are respectively mounted, a left back portion and a right back portion attached respectively to said left frame and said right frame, a frame mounting means for mounting said left frame and said right frame for horizontal movement on said chasis in a direction perpendicular to the horizontal reference axis, an open bottom and a bottom support means in said open bottom for centering the tire between said two side walls with said bottom support means including two bottom plates which are located on opposite sides of a vertical plane through the horizontal reference axis and which are inclined slightly toward one another such that the tire is centered as the tire rests on both said bottom plates,
  (b) a side moving means for moving said side walls inwardly along said frame mounting means toward the tire centered on said bottom platers, said side moving means including a linkage means connected to both of said frames for controlling the movement of said side walls and respective frames along said frame mounting means such that said side walls move in unison toward or away from the horizontal reference axis,
  (c) a bottom moving means for moving bottom plates upwardly as a unit at the same time and at the same rate at which said side walls are moved toward each other by said side moving means,
  (d) a stop means for stopping the movement of said side moving means and said bottom moving means when both said side walls are immediately adjacent the tire, said stop means including as switch located adjacent one of said side walls which is actuated when the tire contacts said one of said side walls,
- (e) an erector means for holding the tire flat against said back portions after said side walls have stopped moving such that the radial center axis of the tire is positioned along the horizontal reference axis, said erector means including two erector members disposed parallel and adjacent to said front wall and adjacent respective said side walls, an erector moving means for moving said erector members towards and away from said back portions, and an erector mounting means for resiliently mounting said erector members to said erector moving means such that the tire is movable past said erector members,
- (f) a front lifting means for lifting said front wall from in front of the tire, and
- (g) a switch means located in said open bottom which is contacted by a tire entering said catch box for initiating actuation of said side moving means and said bottom moving means;

a tire gripping means for gripping the rim of the tire including a plurality of fingers located equidistantly about the horizontal reference axis and disposed parallel to the horizontal reference axis, and a finger moving means for selectively moving said fingers radially from said horizontal reference axis whereby the rim of the tire is engaged and gripped by said fingers;

a tire moving means for moving said catch box relative to said tire gripping means along the horizontal reference axis whereby said tire gripping means engages the tire in said catch box and subsequently said catch box is moved away from the tire gripped by said tire gripping means;

a tire cutting means for cutting the tread from the bead of the tire including
- (a) a cutting device,
- (b) a cutter moving means for radially moving said cutting device into engagement with the tire after mounting on said fingers, said cutter moving means including a positioning means for positioning said cutter device a predetermined radial distance away from the adjacent said finger and a limit means for preventing said cutting device from contacting said fingers, and
- (c) a rotating means for rotating the tire at least one revolution; and a tire ejecting means for ejecting the remaining bead of the tire from said tire gripping means, said tire ejecting means including a plurality of pusher members mounted for movement on respective said fingers and a pusher moving means for moving said pusher members back and forth along respective said fingers in unison.

* * * * *